United States Patent
Amagai et al.

(10) Patent No.: US 6,201,061 B1
(45) Date of Patent: Mar. 13, 2001

(54) PROCESS FOR PRODUCING A NOVEL RESIN FOR OPTICAL MATERIALS HAVING EXCELLENT COLOR TONE AND TRANSPARENCY

(75) Inventors: Akikazu Amagai; Motoharu Takeuchi; Katsuyuki Mizuno, all of Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/268,784

(22) Filed: Mar. 16, 1999

(30) Foreign Application Priority Data

Mar. 26, 1998 (JP) .................................. 10-079734

(51) Int. Cl.$^7$ ...................................... C08K 5/34
(52) U.S. Cl. ............................................. 524/720
(58) Field of Search .............................. 524/720

(56) References Cited

U.S. PATENT DOCUMENTS 5,369,141 * 11/1994 Coleman ............................. 523/106
5,425,122 * 6/1995 Matsumura ......................... 385/124

* cited by examiner

Primary Examiner—Paul R. Michl
(74) Attorney, Agent, or Firm—Frishauf, Holtz, Goodman, Langer & Chick, P.C.

(57) ABSTRACT

A process for producing a resin used for preparing an optical material. The process comprises curing a composition comprising an ultraviolet light absorbent and an epithio compound by polymerization in the presence of a catalyst, wherein the ultraviolet light absorbent and the catalyst are in amounts, each expressed as parts by weight per 100 parts by weight of the total amount of the epithio compound, which satisfy both of the following relationships (a) and (b): (a) $0.001 \leq$ ultraviolet light absorbent $\leq 1,000$, and (b) $0.001 \leq$ catalyst $\leq 5,000$. The process prevents coloration and clouding of optical material for a lens obtained by polymerization of an epithio compound caused by addition of an ultraviolet light absorbent.

18 Claims, No Drawings

PROCESS FOR PRODUCING A NOVEL RESIN FOR OPTICAL MATERIALS HAVING EXCELLENT COLOR TONE AND TRANSPARENCY

BACKGROUND OF THE INVENTION

1. Field of the Invention

The present invention relates to a process for producing an optical material such as a plastic lens, a prism, an optical fiber, a substrate of information recording materials and a filter, and more particularly, to a process for producing a plastic lens of glasses having excellent color tone and transparency.

2. Description of the Related Arts

Plastic materials have widely been used as various optical materials, particularly as lenses of their glasses, because of light weight, toughness and easiness of tinting. The properties required for optical materials, as particularly for lenses of glasses, are a low specific gravity and optical properties such as a large refractive index and a large Abbe number. It is also required that optical materials are colorless and transparent and show no change in color tone after use for a long time. A large refractive index is important to decrease the thickness of a lens. A large Abbe number is important to decrease the chromatic aberration of a lens and to decrease fatigue of eyes.

As conventional materials having a large refractive index, thermosetting optical materials having a thiourethane structure which are obtained by the reaction of a polythiol compound and a polyisocyanate compound have been proposed (Japanese Patent Publication Heisei 4(1992)-58489 and Japanese Patent Application Laid-Open No. Heisei 5(1993)-148340). Technology to obtain a lens by copolymerization of an epoxy resin or an epithio resin with a multi-functional compound have also been proposed in the specifications of Japanese Patent Application Laid-Open No. Heisei 1(1989)-98615, Japanese Patent Application Laid-Open No. Heisei 3(1991)-81320 and International Publication No. WO8910575. However, in accordance with the above technologies, a molecular design for an increase in the refractivity index causes a decrease in the Abbe number and it is difficult to obtain a balance between a sufficiently high refractivity index and a large Abbe number.

To overcome the above problem, the present inventors discovered compounds containing sulfur which have a novel structure containing an epithio structure or an epithioalkylthio structure and optical materials obtained by curing the compounds by polymerization.

However, the above optical materials tend to show change in color to a yellowish or greenish color when the materials are left standing for a long time and improvement in light resistance has been desired.

As the result of studies on the coloration, it was found that the problem can be overcome by addition of an ultraviolet light absorbent.

However, the addition of an ultraviolet light absorbent gave rise to a new problem in that the optical materials are colored after being prepared and are also clouded. In other words, the optical material having an epithio structure or an epithioalkylthio structure shows more marked coloring and clouding than those of conventional optical materials when an ultraviolet light absorbent is added. Therefore, it has been strongly desired that the above problems are overcome.

SUMMARY OF THE INVENTION

The object of the present invention is to overcome the problems that resins which are obtained by curing a compound having an epithio structure or an epithioalkylthio structure by polymerization and show an excellent balance between the refractivity index and the Abbe number tend to show change in color after use for a long time and that a resin prepared by addition of an ultraviolet light to solve this problem is colored after being prepared (initial coloration), shows clouding of the material and cannot be used as an optical material, and in particular, as a lens.

The above problems can be solved by a process for producing a resin used for optical materials which process comprises, by polymerization in the presence of a catalyst, curing a composition comprising an ultraviolet light absorbent and an epithio compound having, in one molecule thereof, one or more structures represented by the following general formula (1):

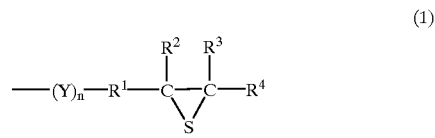

wherein $R^1$ represents a hydrocarbon group having 1 to 10 carbon atoms, $R^2$, $R^3$ and $R^4$ each represents hydrogen atom or a hydrocarbon group having 1 to 10 carbon atoms, Y represents S or O and n represents 0 or 1;

wherein amounts of the ultraviolet light absorbent and the catalyst, each expressed as parts by weight per 100 parts by weight of the total amount of the epithio compound, the ultraviolet light absorbent and the catalyst, satisfy both of the following relations (a) and (b):

$$0.001 \leq \text{ultraviolet light absorbent} \leq 1.000 \quad (a)$$

$$0.001 \leq \text{catalyst} \leq 5.000 \quad (b)$$

DESCRIPTION OF THE PREFERRED EMBODIMENTS

To obtain a high refractivity index, a large Abbe number and an excellent balance between these properties which are the object of the present invention, it is preferable that $R^1$ in formula (1) represents a methylene group or an ethylene group and $R^2$, $R^3$ and $R^4$ each represents a hydrogen atom or a methyl group. It is more preferable that $R^1$ represents a methylene group and $R^2$, $R^3$ and $R^4$ each represents a hydrogen atom. The content of S is preferably 90% or more in average, more preferably 95% or more in average and most preferably substantially 100% of the total number of S and O constituting the three-membered ring. n preferably represents 1. Y may represent either S or O. It is preferable that the content of S is 50% or more in average, more preferably 90% or more in average and most preferably substantially 100% of the total number of S and O.

In the present invention, any compound having one or more structures represented by formula (1) in one molecule thereof can be used. The average number of the structure represented by formula (1) is preferably 1.3 or more and more preferably 2 or more in one molecule of the compound. Examples of the compound having one or more structures represented by general formula (1) in one molecule include the following compounds (A), (B) and (C):

(A) Organic compounds having one or more epithio groups (B) Organic compounds having one or more epithioalkyloxy groups (C) Organic compounds having one or more epithioalkylthio groups Organic compounds (A), (B), and (C) have a chain backbone structure, an alicyclic backbone structure, an aromatic backbone structure or a heterocyclic backbone structure having nitrogen atom, oxygen atom or sulfur atom. The organic compounds may have a combination of epithio groups, epithioalkyloxy groups and epithioalkylthio groups in one molecule. The organic compound may also have sulfide linkages, ether linkages, sulfone linkages, ketone linkages, ester linkages, amide linkages or urethane linkages.

Preferable examples of the organic compound having one or more epithio groups of compound (A) include compounds obtained by replacing one or more epoxy groups in compounds having epoxy groups (not glycidyl groups) with epithio groups. Specific examples of the above compound include:

organic compounds having a chain aliphatic backbone structure such as 1,1-bis(epithioethyl)methane, 1-(epithioethyl)-1-(β-epithiopropyl)-methane, 1,1-bis(β-epithiopropyl)methane, 1-(epithioethyl)-1-(β-epithiopropyl)-ethane, 1,2-bis(β-epithiopropyl)ethane, 1-(epithioethyl)-3-(β-epithiopropyl)butane, 1,3-bis(β-epithiopropyl)propane, 1-(epithioethyl)-4-(β-epithiopropyl) pentane, 1,4-bis(β-epithiopropyl)butane, 1-(epithio-ethyl)-5-(β-epithiopropyl) hexane, 1-(epithioethyl)-2-(γ-epithiobutylthio)-ethane, 1-(epithioethyl)-2-[2-(γ-epithiobutylthio)ethylthio]ethane, tetrakis-(β-epithiopropyl)methane, 1,1,1-tris(β-epithiopropyl)propane, 1,3-bis(β-epithiopropyl)-1-(β-epithiopropyl)-2-thiapropane and 1,5-bis(β-epithiopropyl)-2,4-bis(β-epithiopropyl)-3-thiapentane;

compounds having an alicyclic backbone structure such as 1,2:3,4-diepithiocyclohexane, 1,2:4,5-diepthiocyclohexane, 4-epithioethyl-1,2-epithiocyclohexane, 1,3- and 1,4-bis(epithioethyl)cyclohexanes, 1,3- and 1,4-bis(β-epithiopropyl)cyclohexanes, bis[4-(epithioethyl)cyclohexyl]-methane, bis[4-(β-epithiopropyl)cyclohexyl]methane, 2,2-bis[4-(epithioethyl)cyclohexyl]propane, 2,2-bis[4-(β-epithiopropyl)cyclohexyl]-propane, bis[4-(β-epithiopropyl)-cyclohexyl] sulfide, bis[4-(epithioethyl)cyclohexyl] sulfide, 2,5-bis-(epithioethyl)-1,4-dithiane, 2,5-bis(β-epithiopropyl)-1,4-dithiane, 4-epithioethyl-1,2-cyclohexene sulfide and 4-epoxy-1,2-cyclohexene sulfide;

compounds having an aromatic backbone structure such as 1,3- and 1,4-bis(epithioethyl)benzenes, 1,3- and 1,4-bis(β-epithiopropyl)benzenes, bis[4-(epithioethyl)phenyl]methane, bis[4-(β-epithiopropyl)phenyl]-methane, 2,2-bis[4-(epithioethyl)phenyl]propane, 2,2-bis[4-(β-epithiopropyl)phenyl]propane, bis[4-(epithioethyl)phenyl sulfide, bis[4-(β-epithiopropyl)phenyl] sulfide, bis[4-(epithioethyl)phenyl] sulfone, bis[4-(β-epithiopropyl)phenyl] sulfone, 4,4'-bis(epithioethyl)biphenyl and the like compounds and 4,4'-bis(β-epithiopropyl)biphenyl and the like compounds; and compounds obtained by replacing at least one hydrogen atom of the epithio group with methyl group.

Preferable examples of the organic compound having one or more epithioalkyloxy groups of compound (B) include compounds obtained by replacing one or more glycidyl groups in epoxy compounds derived from an epihalohydrin with epithioalkyloxy groups (thioglycidyl groups). Specific examples of the above epoxy compound include epoxy compounds derived from phenols which are produced by condensation of epihalohydrins with polyhydric phenols such as hydroquinone, catechol, resorcinol, bisphenol A, bisphenol F, bisphenol sulfone, bisphenol ether, bisphenol sulfide, halogenated bisphenol A and novolak resins; epoxy compounds derived from alcohols which are produced by condensation of epihalohydrins with polyhydric alcohols such as ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane trimethacrylate, pentaerythritol, 1,3- and 1,4-cyclohexanediols, 1,3- and 1,4-cyclohexanedimethanols, hydrogenated bisphenol A, adducts of ethylene oxide and bisphenol A and adducts of propylene oxide and bisphenol A; epoxy compounds of glycidyl esters which are produced by condensation of epihalohydrins with polybasic carboxylic acid compounds such as adipic acid, sebacic acid, dodecanedicarboxylic acid, dimer acid, phthalic acid, isophthalic acid, terephthalic acid, tetrahydrophthalic acid, methyltetrahydrophthalic acid, hexahydrophthalic acid, hexahydro-isophthalic acid, hexahydroterephthalic acid, HET acid, nadic acid, maleic acid, succinic acid, fumaric acid, trimellitic acid, benzenetetracarboxylic acid, benzophenonetetracarboxylic acid, naphthalenedicarboxylic acid and diphenyldicarboxylic acid; epoxy compounds derived from amines which are produced by condensation of epihalohydrins with primary diamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl) ether, 1,2-bis(3-aminopropoxy)ethane, 1,3-bis(3-aminopropoxy)-2,2'-dimethylpropane, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, isophoronediamine, 1,4-bisaminopropylpiperadine, m- and p-phenylenediamines, 2,4- and 2,6-tolylenediamines, m- and p-xylylenediamines, 1,5- and 2,6-naphthalenediamines, 4,4'-diaminodiphenylmethane, 4,4'-diaminodiphenyl ether and 2,2-(4,4'-diaminodiphenyl)propane; epoxy compounds derived from amines which are produced by condensation of epihalohydrins with secondary diamines such as N,N'-dimethylethylenediamine, N,N'-dimethyl-1,2-diaminopropane, N,N'-dimethyl-1,3-diaminopropane, N,N-dimethyl-1,2-diaminobutane, N,N-dimethyl-1,3-diaminobutane, N,N'-dimethyl-1,4-diaminobutane, N,N-dimethyl-1,5-diaminopentane, N,N'-dimethyl-1,6-diaminohexane, N,N'-dimethyl-1,7-diaminoheptane, N,N'-diethyl-ethylene diamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperadyl)methane, 1,2-di(4-piperidyl)ethane, 1,3-di(4-piperidyl)propane and 1,4-di(4-piperidyl)butane; and epoxy compounds of urethane produced from the above polyhydric alcohols, the above phenols, diisocyanates and glycidol.

More specific examples of compound (B) include:

compounds having a chain aliphatic backbone structure such as bis(β-epithiopropyl) ether, bis(β-epithiopropyloxy)methane, 1,2-bis(β-epithiopropyloxy)ethane, 1,3-bis(β-epithiopropyloxy)propane, 1,2-bis(β-epithiopropyloxy)propane, 1-(β-epithiopropyloxy)-2-(β-epithiopropyloxy-methyl)propane, 1,4-bis(β-epithiopropyloxy)butane, 1,3-bis (β-epithiopropyloxy)butane, 1-(β-epithiopropyloxy)-3-(β-epithiopropyloxy-methyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, 1-(β-epithiopropyloxy)-5-(β-epithiopropyloxymethyl)hexane, 1-(β-epithiopropyloxy)-2-[(2- -epithiopropyloxyethyl)oxy]ethane and 1-(β-epithiopropyloxy)-2-[[2-(2-β-epithiopropyloxyethyl)oxyethyl]oxy]ethane;

compounds having a branched chain aliphatic structure such as tetrakis-(β-epithiopropyloxymethyl)methane, 1,1,1-tris(β-epithiopropyl-oxymethyl)propane, 1,5-bis(β-epithiopropyloxy)-2-(β-epithiopropyloxy-methyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy)-4-(β-epithiopropyloxymethyl)-3,6-dithiaoctane, 1,8-bis(β-epithiopropyloxy)-4,5-bis(β-epithiopropyloxymethyl)-3,6-dithiaoctane, 1,8-bis(β-epithiopropyloxy)-4,4-bis(β-epithiopropyloxymethyl)-3,6-dithiaoctane, 1,8-bis(β-epithiopropyloxy)-2,4,5-tris(β-epithiopropyloxymethyl )-3,6-dithiaoctane, 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2- β-epithiopropyloxyethyl)oxymethyl]-3,7-dithianonane, 1,10-bis(β-epithiopropyloxy)-5,6-bis[(2-β-epithiopropyloxyethyl)oxy]-3,6,9-trithiadecane, 1,11-bis(β-epithiopropyloxy)-4,8-bis(β-epithiopropyloxymethyl)-3,6,9-trithiaundecane, 1,11-bis(β-epithiopropyloxy)-5,7-bis(β-epithiopropyloxymethyl)-3,6,9-trithiaundecane, 1,11-bis(β-epithiopropyloxy)-5,7-[(2- β-epithiopropyloxyethyl)oxymethyl]-3,6,9-trithiaundecane and 1,11-bis(β-epithiopropyloxy)-4,7-bis(β-epithiopropyloxymethyl)-3,6,9-trithiaundecane;

compounds having an alicyclic backbone structure such as 1,3- and 1,4-bis(β-epithiopropyloxy)cyclohexanes, 1,3- and 1,4-bis(β-epithiopropyloxymethyl)cyclohexanes, bis[4-(β-epithiopropyloxy)cyclohexyl]-methane, 2,2-bis[4-(β-epithiopropyloxy)cyclohexyl]propane, bis[4-(β-epithiopropyloxy)cyclohexyl] sulfide, 2,5-bis(β-epithiopropyloxymethyl)-1,4-dithiane and 2,5-bis(β-epithiopropyloxyethyloxymethyl)-1,4-dithiane;

compounds having an aromatic backbone structure such as 1,3- and 1,4-bis(β-epithiopropyloxy)benzenes, 1,3- and 1,4-bis(β-epithiopropyloxymethyl)benzenes, bis[4-(β-epithiopropyloxy)phenyl]methane, 2,2-bis[4-(β-epithiopropyloxy)phenyl]propane, bis[4-(β-epithiopropyloxy)-phenyl] sulfide, bis[4-(13-epithiopropyloxy)phenyl] sulfone and 4,4'-bis(β-epithiopropyloxy)biphenyl; and compounds obtained by replacing at least one hydrogen atom in the epithio group of the above compounds with a methyl group.

Preferable examples of the organic compound having one or more epithioalkylthio groups of compound (C) include compounds obtained by replacing one or more epoxyalkylthio groups (specifically, β-epoxypropylthio groups) in epoxy compounds derived from a compound having mercapto group and an epihalohydrin with epithioalkylthio groups.

Specific examples of the above compound include:

compounds having a chain aliphatic backbone structure such as bis(β-epithiopropyl) sulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane and 1-(β-epithiopropylthio)-2-[[2-(2-β-epithiopropylthioethyl)thioethyl]thio]ethane;

compounds having a branched chain aliphatic backbone structure such as tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4 -(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis [(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane and 1,11-bis(β-epithiopropylthio)-4,7-bis(β-epithiopropylthiomethyl)-3,6,9-trithia-undecane;

chain compounds having an ester group and an epithioalkylthio group such as tetra[2-(β-epithiopropylthio)acetylmethyl]methane, 1,1,1-tri[2-(β-epithiopropylthio)acetylmethyl]propane, tetra[2-(β-epithiopropylthiomethyl)acetylmethyl]methane and 1,1,1-tri[2-(β-epithiopropylthioethyl)acetylmethyl]propane;

compounds having an alicyclic backbone structure such as 1,3- and 1,4-bis(β-epithiopropylthio)cyclohexanes, 1,3- and 1,4-bis(β-epithiopropylthiomethyl)cyclohexanes, bis[4-(β-epithiopropylthio)cyclohexyl]-methane, 2,2-bis[4-(β-epithiopropylthio)cyclohexyl]propane, bis[4-(β-epithiopropylthio)cyclohexyl] sulfide, 2,5-bis(β-epithiopropylthiomethyl)-1,4-dithiane and 2,5-bis(β-epithiopropylthioethylthiomethyl)-1,4-dithiane;

compounds having an aromatic backbone structure such as 1,3- and 1,4-bis(β-epithiopropylthio)benzenes, 1,3- and 1,4-bis(β-epithiopropylthiomethyl)benzenes, bis[4-(β-epithiopropylthio)phenyl]methane, 2,2-bis[4-(β-epithiopropylthio)phenyl]propane, bis[4-(β-epithiopropylthio)phenyl] sulfide, bis[4-(β-epithiopropylthio)phenyl] sulfone and 4,4'-bis(β-epithiopropylthio)biphenyl; and compounds obtained by replacing at least one hydrogen atom in the epithio group of the above compounds with methyl group.

Examples of compounds (A) to (C) also include organic compounds having unsaturated groups. Specific examples of such compounds include vinylphenyl thioglycidyl ether, vinylbenzyl thioglycidyl ether, thioglycidyl methacrylate, thioglycidyl acrylate and allyl thioglycidyl ether.

Specific examples of the compounds having one epithio group include compounds such as ethylene sulfide, propylene sulfide and thioglycidol; thioglycidyl esters of monocarboxylic acids such as acetic acid, propionic acid and benzoic acid; and thioglycidyl ethers such as methyl thioglycidyl ether, ethyl thioglycidyl ether, propyl thioglycidyl ether and butyl thioglycidyl ether.

Among the above compounds, the organic compounds having one or more epithioalkyloxy groups of compound (B) and the organic compounds having one or more epithioalkylthio groups of compound (C), which are described as the examples of the compound having one or more structures represented by general formula (1) in one molecule, are preferable. The compounds having one or more epithioalkylthio groups of compound (C) are more preferable. Examples of still more preferable compounds include bis (β-epithiopropyl) sulfide and chain compounds, branched compounds, alicyclic compounds and aromatic compounds having two or more β-epithiopropylthio groups which are described above as the examples.

As the ultraviolet absorbent used in the present invention, any compound having the ability to absorb ultraviolet light can be used. Typical examples of the ultraviolet light absorbent include salicylic acid ultraviolet light absorbents, benzophenone ultraviolet light absorbents, benzotriazole ultraviolet light absorbents and cyanoacrylate ultraviolet light absorbents. Specific examples of the salicylic acid ultrovialet light absorbent include phenyl salicylate, 4-tert-butylphenyl salicylate, 4-tert-octylphenyl salicylate and 2,4-di-tert-butylphenyl-3',5'-di-tert-butyl-4'-hydroxybenzoate. Specific examples of the benzophenone ultraviolet light absorbent include 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone and 2-hydroxy-4-methoxy-5-sulfobenzophenone. Specific examples of the benzotriazole ultraviolet light absorbent include 2-(2'-hydroxy-5'-methylphenyl)benzotriazole, 2-(2'-hydroxy-5'-methoxyphenyl)benzotriazole, 2-(2'-hydroxy-5'-n-butylphenyl)benzotriazole, 2-(2'-hydroxy-5'-tert-butylphenyl)benzotriazole, 2-(2'-hydroxy-5'-n-octylphenyl) benzotriazole, 2-(2'-hydroxy-5'-n-octoxyphenyl) benzotriazole, 2-(2'-hydroxy-5'-tert-octylphenyl) benzotriazole, 2-(2'-hydroxy-4'-n-octylphenyl) benzotriazole, 2-(2'-hydroxy-4'-n-octoxyphenyl) benzotriazole, 2-(2'-hydroxy-4'-tert-octylphenyl) benzotriazole, 2-(2'-hydroxy-3',5'-di-tert-butylphenyl)-benzotriazole, 2-(2'-hydroxy-3',5'-dicumylphenyl) benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amylphenyl)benzotriazole, 2-(2'-hydroxy-3'-(3",4", 5",6"-tetrahydrophthalimidomethyl)-5'-methylphenyl) benzotriazole and 6-(2-benzotriazolyl)-4-tert-octyl-6'-tert-butyl-4'-methyl-2,2'-methylenebisphenol. Specific examples of the cyanoacrylate ultraviolet light absorbent include 2-ethylhexyl-2-cyano-3',3'-diphenyl acrylate and ethyl-2-cyano-3',3'-diphenyl acrylate. From the standpoint of prevention of change in color after use for a long time, coloration after the preparation and clouding of the material, the benzophenone ultraviolet light absorbents, benzotriazole ultraviolet light absorbents and cyanoacrylate ultraviolet light absorbents are preferable among these ultraviolet light absorbents. From the above standpoint, benzotriazole ultraviolet light absorbents are more preferable.

Examples of the curing catalyst used for producing an optical material in accordance with the process of the present invention include amines, phosphines, mineral acids, Lewis acids, organic acids, silicic acids and tetrafluoroboric acid. Specific examples of the curing catalysts are as follows:

(1) Primary monoamines such as ethylamine, n-propylamine, sec-propylamine, n-butylamine, sec-butylamine, isobutylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenetylamine, α-phenylethylamine, naphthylamine and furfurylamine; primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl) ether, 1,2-bis-(3-aminopropoxy)ethane, 1,3-bis-(3-aminopropoxy)-2,2'-dimethylpropane, aminoethylethanolamine, 1,2-, 1,3- and 1,4-bisaminocyclohexanes, 1,3-and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, 2- and 4-aminopiperidines, 2- and 4-aminomethylpiperidines, 2- and 4-aminoethylpiperidines, N-aminoethylpiperidine, N-aminopropylpiperidine, N-aminoethylmorpholine, N-aminopropylmorpholine, isophoronediamine, menthanediamine, 1,4-bisaminopropylpiperadine, o-, m- and p-phenylenediamines, 2,4- and 2,6-tolylenediamines, 2,4-toluenediamine, m-aminobenzylamine, 4-chloro-o-phenylenediamine, tetrachloro-p-xylylenediamine, 4-methoxy-6-methyl-m-phenylenediamine, m- and p-xylylenediamines, 1,5- and 2,6-naphthalenediamines, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenyl sulfone, 4,4'-diaminoditolyl sulfone, methylenebis(o-chloroaniline), 3,9-bis(3-aminopropyl)-2,4,8,10-tetraoxaspiro[5,5]undecane, diethylenetriamine, iminobispropylamine, methyliminobispropylamine, bis(hexamethylene)-triamine, triethylenetetramine, tetraethylenepentamine, pentaethylenehexamine, N-aminoethylpiperadine, N-aminopropylpiperadine, 1,4-bis(aminoethylpiperadine), 1,4-bis(aminopropylpiperadine), 2,6-diaminopyridine and bis(3,4-diaminophenyl) sulfone; secondary monoamines such as diethylamine, dipropylamine, di-n-butylamine, di-sec-butylamine, diisobutylamine, di-n-pentylamine, di-3-pentylamine, dihexylamine, dioctylamine, di(2-ethylhexyl) amine, methylhexylamine, diallylamine, pyrrolidine, piperidine, 2-, 3- and 4-picolines, 2,4-, 2,6- and 3,5-lupetidines, diphenylamine, N-methylaniline, N-ethylaniline, dibenzylamine, methylbenzylamine, dinaphthylamine, pyrrol, indoline, indole and morpholine; secondary polyamines such as N,N'- dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperidyl)methane, 1,2-di(4-piperidyl)ethane, 1,3-di(4-piperidyl)propane, 1,4-di(4-piperidyl)butane and tetramethylguanidine; tertiary amines such as trimethylamine, triethylamine, tri-n-propylamine, triisopropylamine, tri-1,2-dimethylpropylamine, tri-3-methoxypropylamine, tri-n-butylamine, triisobutylamine, tri-sec-butylamine, tri-n-pentylamine, tri-3-pentylamine, tri-n-hexylamine, tri-n-octylamine, tri-2-ethylhexylamine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyl-dicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine and 2-(2-dimethylaminoethoxy)-4-methyl-1,3,2-dioxabornane; tertiary polyamines such as tetramethylethylenediamine, pyrazine, N,N'-dimethylpiperadine, N,N'-bis((2-hydroxy)propyl) piperadine, hexamethylenetetramine, N,N,N',N'-tetramethyl-1,3-butaneamine, 2-dimethylamino-2-hydroxypropane, diethyaminoethanol, N,N,N-tris(3-dimethylaminopropyl)amine, 2,4,6-tris(N,N,N-dimethylaminomethyl)phenol and heptamethyl-isobiguanide; imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cycanoethyl)-2-undecylimidazole, N-(2'-cyanoethyl)-2-phenylimidazole, 3,3-bis-(2-ethyl-4-methylimidazolyl) methane, addition products of alkylimidazoles and isocyanuric acid and condensation products of alkylimidazoles and formaldehyde; and amidines such as 1,8-diazabicyclo-(5,4,0)undecene-7, 1,5-diazabicyclo(4,3,0)nonene-5, 6-dibutylamino-1,8-diazabicyclo(5,4,0)-undecene-7.

(2) Salts of the amines described above in (1) with mineral acids, Lewis acids, organic acids, silicic acid and tetrafluoroboric acid.

(3) Quaternary ammonium salts such as tetramethylammonium chloride, tetramethylammonium bromide, tetramethylammonium acetate, tetraethylammonium chloride, tetraethylammonium bromide, tetraethylammonium acetate, tetra-n-butylammonium fluoride, tetra-n-butylammonium chloride, tetra-n-butylammonium bromide, tetra-n-butylammonium iodide, tetra-n-butylammonium acetate, tetra-n-butylammonium borohydride, tetra-n-butylammonium hexafluoro-phosphite, tetra-n-butylammonium hydrogensulfite, tetra-n-butylammonium tetrafluoroborate, tetra-n-butylammonium tetraphenylborate, tetra-n-butylammonium para-toluenesulfonate, tetra-n-hexylammonium chloride, tetra-n-hexylammonium bromide, tetra-n-hexylammonium acetate, tetra-n-octylammonium chloride, tetra-n-octylammonium bromide, tetra-n-octylammonium acetate, trimethyl-n-octylammonium chloride, trimethylbenzylammonium chloride, trimethylbenzylammonium bromide, triethyl-n-octylammonium chloride, triethylbenzylammonium chloride, triethylbenzylammonium bromide, tri-n-butyl-n-octylammonium chloride, tri-n-butylbenzylammonium fluoride, tri-n-butylbenzylammonium chloride, tri-n-butylbenzylammonium bromide, tri-n-butylbenzylammonium iodide, methyltriphenylammonium chloride, methyltriphenylammonium bromide, ethyltriphenylammonium chloride, ethyltriphenylammonium bromide, n-butyltriphenylammonium chloride, n-butyltriphenylammonium bromide, 1-menthylpyridinium bromide, 1-ethylpyridinium bromide, 1-n-butylpyridinium bromide, 1-n-hexylpyridinium bromide, 1-n-octylpyrddimium bromide, 1-n-dodecylpyridinium bromide, 1-n-phenylpyridinium bromide, 1-methylpicolinium bromide, 1-ethylpinolinium bromide, 1-n-butylpicolinium bromide, 1-n-hexylpicolinium bromide, 1-n-octylpicolinium bromide, 1-n-dodecylpicolinium bromide and 1-phenylpicolinium bromide.

(4) Phosphonium salts such as tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, tetra-n-octylphosphonium bromide, methyltriphenylphosphonium bromide, methyltriphenylphosphonium iodide, ethyltriphenylphosphonium bromide, ethyltriphenylphosphonium iodide, n-butyltriphenylphosphonium bromide, n-butyltriphenylphosphonium iodide, n- hexyltriphenylphosphonium bromide, n-octyltriphenylphosphonium bromide, tetraphenylphosphonium bromide, tetrakishydroxymethylphosphonium chloride, tetrakishydroxymethyl-phosphonium bromide, tetrakishydroxyethylphosphonium chloride and tetrakishydroxybutylphosphonium chloride.

(5) Sulfonium salts such as trimethylsulfonium bromide, triethylsulfonium bromide, tri-n-butylsulfonium chloride, tri-n-butylsulfonium bromide, tri-n-butylsulfonium iodide, tri-n-butylsulfonium tetrafluoroborate, tri-n-hexylsulfonium bromide, tri-n-octylsulfonium bromide, triphenylsulfonium chloride, triphenylsulfonium bromide and triphenylsulfonium iodide.

(6) Iodonium salts such as diphenyliodonium chloride, diphenyliodonium bromide and diphenyliodonium iodide.

(7) Complexes of the amines described above in (1) with borane and trifluoroboron.

(8) Phosphines such as trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris-(diethylamino)phosphine, tris(4-methylphenyl) phosphine, dimethylphenylphosphine, diethylphenylphosphine, dicyclohexyolphenylphosphine, ethyldiphenylphosphine, diphenylcyclohexylphosphine and chlorodiphenylphosphine.

(9) Mineral acids such as hydrochloric acid, sulfuric acid, nitric acid, phosphoric acid and carbonic acid. Half-esters of these mineral acids can also be used.

(10) Lewis acids such as boron trifluoride and boron trifluoride etherates.

(11) Organic acids and half-esters of organic acids.

(12) Silicic acids and tetrafluoroboric acid.

(13) Compounds of tin such as dibutyltin dilaurate, dibutyltin dichloride and tributyltin chloride.

Among these compounds, primary monoamines, secondary monoamines, tertiary monoamines, tertiary polyamines, imidazoles, amidines, quaternary ammonium salts, phosphines and tin compounds are preferable because these compounds cause little coloring of the cured products. Secondary monoamines, tertiary monoamines, tertiary polyamines, imidazoles, amidines, quaternary ammonium salts and phosphines having one or less group which can react with the epithio group are more preferable. These compounds may be used singly or as a mixture of two or more compounds.

In the process for producing a resin for optical materials of the present invention, the ultraviolet light absorbent and the catalyst are used in amounts satisfying both of the following relations (a) and (b):

$$0.001 \leq \text{ultraviolet light absorbent} \leq 1.000 \quad \text{(a)}$$

$$0.001 \leq \text{catalyst} \leq 5.000 \quad \text{(b)}$$

In the above relations, the amounts of the ultraviolet light absorbent and the catalyst each is expressed as parts by weight per 100 parts by weight of the total amount of the epithio compound, the ultraviolet light absorbent and the catalyst.

It is preferable that the amounts of the ultraviolet light absorbent and the catalyst satisfy the following relations (c) and (d):

$$0.005 \leq \text{ultraviolet light absorbent} \leq 0.500 \quad \text{(c)}$$

$$0.005 \leq \text{catalyst} \leq 5.000 \quad \text{(d)}$$

It is more preferable that the amounts of the ultraviolet light absorbent and the catalyst satisfy the following relations (e) and (f):

$$0.010 \leq \text{ultraviolet light absorbent} \leq 0.300 \quad \text{(e)}$$

$$0.010 \leq \text{catalyst} \leq 3.000 \quad \text{(f)}$$

When the amounts of the ultraviolet light absorbent and the catalyst do not satisfy the above relations, the obtained optical material shows change in color after use for a long time, coloration after the preparation and clouding of the material and cannot be used as the optical material. More specifically, when the amount of the ultraviolet light absorbent is less than the above range, the light resistance of the optical material is not improved and a change in color takes place after use for a long time. When the amount of the ultraviolet light absorbent exceeds the above range, the optical material shows coloration after the preparation and clouding. When the amount of the catalyst is less than the above range, the optical material shows clouding. When the amount of the catalyst exceeds the above range, the optical material shows coloration after the preparation, particularly immediately after preparation, and also clouding of the material. All these problems can be prevented only when the amounts of the ultraviolet light absorbent and the catalyst satisfy both of the above relations.

The resin for optical materials of the present invention can be produced by adding to the composition used in the present invention a compound having one or more functional groups which are reactive with the epithio group, a compound having one or more functional groups which are reactive with the epithio group and one or more other homopolymerizable functional groups, a compound having one or more homopolymerizable functional group or a compound having one homopolymerizable functional group which is reactive with the epithio group.

As the curing catalyst, the amines, phosphines and acids described above can be used. Specific examples of the curing catalyst include the same compounds described above. The curing catalyst is used in an amount satisfying both of the above relations (a) and (b).

Examples of the compound having two or more functional groups which are reactive with the epithio group include epoxy compounds and polybasic carboxylic acid anhydrides.

Examples of the compound having one or more functional groups which are reactive with the epithio group and one or more other homopolymerizable functional groups include epoxy compounds and carboxylic acid anhydrides having unsaturated groups such as methacryl group, acryl group, allyl group, vinyl group and aromatic vinyl groups.

Examples of the compound having one or more homopolymerizable functional group include compounds having unsaturated groups such as a methacryl group, an acryl group, an allyl group, a vinyl group and aromatic vinyl groups.

Specific examples of the compound having two or more functional groups which are reactive with the epithio group are as follows.

Specific examples of the epoxy compounds include the compounds described above as the examples of the epoxy compounds which provide the compounds having epithioalkyloxy groups.

Examples of the polybasic carboxylic acid anhydride include the compounds described above as the examples of the carboxylic acid anhydrides which provide the epoxy compounds by the condensation with epihalohydrins.

Specific examples of the compound having one or more functional groups which are reactive with the epithio group and one or more other homopolymerizable functional groups are as follows.

Examples of the epoxy compound having unsaturated groups include vinylphenyl glycidyl ether, vinylbenzyl glycidyl ether, glycidyl methacrylate, glycidyl acrylate and allyl glycidyl ether.

Examples of the compound having one or more homopolymerizable functional groups include compounds having a structure of an ester of acrylic acid or methacrylic acid and a mono- or polyhydric alcohol such as methyl acrylate, methyl methacrylate, ethyl acrylate, ethyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, polyethylene glycol diacrylate, polyethylene glycol dimethacrylate, 1,3-butylene glycol diacrylate, 1,3-butylene glycol dimethacrylate, 1,6-hexanediol diacrylate, 1,6-hexanediol dimethacrylate, neopentyl glycol diacrylate, neopentyl glycol dimethacrylate, polypropylene glycol diacrylate, polypropylene glycol dimethacrylate, 2,2-bis[4-(acryloxyethoxy)phenyl]propane, 2,2-bis[4-(methacryloxyethoxy)phenyl]propane, 2,2-bis[4-(acryloxy-diethoxy)-phenyl]propane, 2,2-bis[4-(methacryloxy-diethoxy)phenyl]propane, 2,2-bis[4-(acryloxy-polyethoxy)phenyl]propane, 2,2-bis[4-(methacryloxy-polyethoxy)phenyl]propane, trimethylolpropane triacrylate, trimethylolpropane trimethacrylate, pentaerythritol tetraacrylate, pentaerythritol tetramethacrylate, bis(2,2,2-trimethylolethyl) ether hexaacrylate and bis(2,2,2-trimethylolethyl) ether hexamethacrylate; allyl compounds such as allyl sulfide, diallyl phthalate and diethylene glycol bisallylcarbonate; vinyl compounds such as acrolein, acrylonitrile and vinyl sulfide; and aromatic vinyl compounds such as styrene, α-methylstyrene, methylvinylbenzene, ethylvinylbenzene, α-chlorostyrene, chlorovinylbenzene, vinylbenzyl chloride, para-divinylbenzene and meta-divinylbenzene.

Preferable examples of the compound having one homopolymerizable functional group which is reactive with the epithio group include compounds having one epoxy group. Specific examples of such compounds include monoepoxy compounds such as ethylene oxide, propylene oxide and glycidol; glycidyl esters of monocarboxylic acids such as acetic acid, propionic acid and benzoic acid; and glycidyl ethers such as methyl glycidyl ether, ethyl glycidyl ether, propyl glycidyl ether and butyl glycidyl ether.

When the compound having unsaturated groups is used, it is preferable that a radical polymerization initiator is used as the polymerization accelerator. Any compound forming a radical by heating or by irradiation of ultraviolet light or electron beams can be used as the radical polymerization initiator. Examples of the radical polymerization initiator include the following conventional polymerization catalysts used under heating: peroxides such as cumyl peroxyneodecanoate, diisopropyl peroxydicarbonate, diallyl peroxydicarbonate, di-n-propyl peroxydicarbonate, dimyristyl peroxydicarbonate, cumyl peroxyneohexanoate, tert-hexyl peroxyneodecanoate, tert-butyl peroxyneodecanoate, tert-hexyl peroxyneohexanoate, tert-butyl peroxyneohexanoate, 2,4-dichlorobenzoyl peroxide, benzoyl peroxide, dicumyl peroxide and di-tert-butyl peroxide; hydroperoxides such as cumene hydroperoxide and tert-butyl hydroperoxide; azo compounds such as 2,2'-azobis(4-methoxy-2,4-dimethylvaleronitrile), 2,2'-azobis(2-cyclopropylpropionitrile), 2,2'-azobis-(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane) and 2,2'-azobis(2,4,4-trimethylpentane); and conventional photopolymerization catalysts such as benzophenone and benzoin benzoinmethyl ether. Among these compounds, peroxides, hydroperoxides and azo compounds are preferable and peroxides and azo compounds are more preferable. Most preferable examples include azo compounds such as 2,2'-azobis(4-methoxy-2,4-dimethylvaleronitrile), 2,2'-azobis(2-cyclopropylpropionitrile), 2,2'-azobis-(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane) and 2,2'-azobis(2,4,4-trimethylpentane). The above compounds may be used singly or as a mixture of the compounds.

The radical polymerization initiator is not the curing catalyst specified in the process of the present invention and the amount used is not required to satisfy the above relations. The amount used is different depending on the components of the composition and the process for curing and cannot be decided. The amount is generally in the range of 0.01 to 5.0% by weight and preferably in the range of 0.1 to 2.0% by weight of the total amount of the composition.

In the process for producing a resin for optical materials of the present invention, of course, it is possible that conventional antioxidants such as hindered amines, hindered phenols and esters of trivalent phosphorus are added to the composition to improve the practical properties of the obtained materials. It is also possible that additives such as agents for preventing yellowing, bluing agents and pigments are added within the range that the object of the present invention is not adversely affected. The optical material produced in accordance with the process of the present invention tends to be cleaved from molds during polymerization. Therefore, it is occasionally necessary that conventional external and/or internal adhesion improvers are used or added to control and improve adhesion between the cured material and the mold. Examples of the internal adhesion improver include silane compounds such as 3-methacryloxypropyltrimethoxysilane, 3-glycidoxypropyltrimethoxysilane, N-(2-aminoethyl)-3-aminopropyltrimethoxysilane and 3-mercaptopropyltrimethoxysilane. The internal adhesion improver can be used in an amount of 0.0001 to 5 parts by weight per 100 parts by weight of the composition of the present invention.

It is also possible that compounds having one or more SH groups is added to the composition used in the present invention as an antioxidant component singly or in combination with conventional antioxidants to provide the cured composition with a further improved antioxidation property. Examples of the compound having one or more SH groups include mercaptans and thiophenols. Further examples include mercaptans and thiophenols having unsaturated groups such as a vinyl group, aromatic vinyl groups, a methacryl group, an acryl group and an allyl group. Specific examples of the mercaptan include monomercaptans such as methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, isopropyl mercaptan, tert-butyl mercaptan, tert-nonyl mercaptan, tert-dodecyl mercaptan, benzyl mercaptan, 4-chlorobenzyl mercaptan, methyl thioglycolate, ethyl thioglycolate, n-butyl thioglycolate, n-octyl thioglycolate, methyl (3-mercaptopropionate), ethyl (3-mercaptopropionate), 3-methoxybutyl (3-mercaptopropionate), n-butyl (3-mercaptpropionate), 2-ethylhexyl (3-mercaptopropionate) and n-octyl (3-mercaptopropionate); and polymercaptans such as methanedithiol, 1,2-dimercaptoethane, 1,2-dimercaptopropane, 2,2-dimercaptopropane, 1,3-dimercaptopropane, 1,2,3- trimercaptopropane, 1,4-dimercaptobutane, 1,6-dimercaptohexane, bis(2-mercaptoethyl) sulfide, 1,2-bis(2-mercaptoethylthio) ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptobutane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis(mercaptomethyl)methane, ethylene glycol bis(2-mercaptoacetate), ethylene glycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,1-dimercaptocyclohexane, 1,4- dimercaptocyclohexane, 1,3-dimercaptocyclohexane, 1,2-dimercaptocyclohexane, 1,4-bis(mercaptomethyl)cyclohexane, 1,3-bis-(mercaptomethyl)cyclohexane, 2,5-bis-(mercaptomethyl)-1,4-dithiane, 2,5-bis(2-mercaptoethyl)-1,4-dithiane, 2,5-bis(mercaptomethyl)-1-thiane, 2,5-bis(2-mercaptoethyl)-1-thiane, 1,4-bis(mercaptomethyl)benzene, 1,3-bis(mercaptomethyl)benzene, bis(4-mercaptophenyl) sulfide, bis(4-mercaptophenyl) ether, 2,2-bis(4-mercaptophenyl)propane, bis(4-mercaptomethylphenyl) sulfide, bis(4-mercaptomethylphenyl) ether, 2,2-bis(4-mercaptomethylphenyl)propane, 2,5-dimercapto-1,3,4-thiadiazole and 3,4-thiophenedithiol.

Specific examples of the thiophenol include thiophenol, 4-tert-butylthiophenol, 2-methylthiophenol, 3-methylthiophenol, 4-methylthiophenol, 1,2-dimercaptobenzene, 1,3-dimercaptobenzene and 1,4-dimercaptobenzene.

Specific examples of the mercaptans and thiophenols having unsaturated groups are as follows.

Specific examples of the mercaptan having unsaturated groups include allyl mercaptan, 2-vinylbenzyl mercaptan, 3-vinylbenzyl mercaptan and 4-vinylbenzyl mercaptan.

Specific examples of the thiophenol having unsaturated groups include 2-vinylthiophenol, 3-vinylthiophenol and 4-vinylthiophenol.

The above compounds can be used in an amount of 0.001 to 40 parts by weight per 100 parts by weight of the composition used in the present invention.

It is also possible that a compound having one or more active hydrogen atoms other than that of SH group is used to improve the properties such as the tint performance and strength. Examples of the active hydrogen atom include hydrogen atoms in the hydroxyl group, carboxyl group and amide group and hydrogen atoms at the 2-position of 1,3-diketones, 1,3-dicarboxylic acids, esters of 1,3-dicarboxylic acids, 3-ketocarboxylic acids and esters of 3-ketocarboxylic acids. Examples of the compound having one or more active hydrogen atoms in one molecule include alcohols, phenols, mercaptoalcohols, hydroxythiophenols, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids, esters of 3-ketocarboxylic acids, and compounds having unsaturated groups such as alcohols, phenols, mercaptoalcohols, hydroxythiophenols, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids and esters of 3-ketocarboxylic acids having a vinyl group, aromatic vinyl groups, a methacryl group, an acryl group and an allyl group.

Examples of the alcohol include monohydric alcohols such as methanol, ethanol, n-propyl alcohol, isopropyl alcohol, n-butyl alcohol, isobutyl alcohol, sec-butyl alcohol, tert-butyl alcohol, n-pentyl alcohol, isopentyl alcohol, n-hexyl alcohol, n-heptyl alcohol, n-octyl alcohol, n-nonyl alcohol, n-decyl alcohol, n-dodecyl alcohol, cyclopentanol, cyclohexanol, 2-methylthioethanol, 2-ethylthioethanol, 2-(n-dodecylthio)ethanol and n-dodecyl hydroxyethyl sulfoxide; and polyhydric alcohols such as ethylene glycol, propylene glycol, 1,3-propanediol, diethylene glycol, triethylene glycol, polyethylene glycol, 1,3-butylene glycol, 1,6-hexanediol, neopentyl glycol, polypropylene glycol, glycerol, pentaerythritol monomethacrylate, pentaerythritol monoacrylate, pentaerythritol dimethacrylate, pentaerythritol diacrylate, 2,5-dimethyl-3-hexyne-2,5-diol, 2,5-dimethyl-hexane-2,5-diol, trimethylolpropane, pentaerythritol, hydrogenated bisphenol A, 2-hydroxyethyl isocyanurate and 2-hydroxyethyl cyanurate.

Examples of the phenol include phenol, o-cresol, m-cresol, p-cresol, catechol, resorcinol, hydroquinone, o-hydroxybenzaldehyde, m-hydroxy-benzaldehyde, p-hydroxybenzaldehyde, bisphenol A, bisphenol F and bisphenol Z.

Examples of the mercaptoalcohol include 2-mercaptoethanol, 3-mercaptopropanol, 2-mercaptopropanol, 2-hydroxypropylmercaptan, 2-phenyl-2-mercaptoethanol, 2-phenyl-2-hydroxyethylmercaptan, 3-mercapto-1,2-propanediol, 2-mercapto-1,3-propanediol, 2,3-dimercaptopropanol, 1,3-dimercapto-2-propanol, 2,2-dimethylpropane-1,3-dithiol and glyceryl dithioglycolate.

Examples of the hydroxythiophenol include 2-hydroxythiophenol, 3-hydroxythiophenol and 4-hydroxythiophenol.

Examples of the carboxylic acid include formic acid, acetic acid, propionic acid, butyric acid, valeric acid, caproic acid, caprylic acid, methyl mercaptopropionate, oxalic acid, malonic acid, succinic acid, glutaric acid, adipic acid, cyclohexanecarboxylic acid, benzoic acid, o-toluic acid, m-toluic acid, p-toluic acid, 2-methoxybenzoic acid, 3-methoxybenzoic acid, phthalic acid, isophthalic acid, terephthalic acid, thiodipropionic acid and dithiodipropionic acid.

Examples of the mercaptocarboxylic acid include thioglycolic acid, 2-thiopropionic acid, 3-thiopropionic acid, thiolactic acid, mercaptosuccinic acid, thiomalic acid, N-(2-mercaptopropionyl)glycine, 2-mercaptobenzoic acid, 2-mercaptonicotinic acid, 3,3-dithioisobutyric acid, dithioglycolic acid, and dithiopropionic acid.

Examples of the hydroxycarboxylic acid include hydroxyacetic acid, α-hydroxypropionic acid, β-hydroxypropionic acid, α-hydroxybutyric acid, β-hydroxybutyric acid, γ-hydroxybutyric acid, salicylic acid, 3-hydroxybenzoic acid and 4-hydroxybenzoic acid.

Examples of the amide include formamide, N-methylformamide, acetamide, N-methylacetamide, phthalamide, isophthalamide, terephthalamide, benzamide, toluamide, 4-hydroxybenzamide and 3-hydroxybenziamide.

Examples of the 1,3-diketone include acetylacetone and cyclohexane-1,3,5-trione.

Examples of the 1,3-dicarboxylic acid and the ester thereof include malonic acid, 2-methylmalonic acid and mono- and diesters thereof.

Examples of the 3-ketocarboxylic acid and the ester thereof include acetoacetic acid and esters thereof.

Specific examples of the alcohol, phenol, mercaptan, thiophenol, mercaptoalcohol, carboxylic acid and amide having unsaturated groups are as follows.

Examples of the alcohol having unsaturated groups include monohydroxy compounds such as 2-hydroxyethyl methacrylate, 2-hydroxyethyl acrylate, 3-hydroxypropyl methacrylate, 3-hydroxypropyl acrylate, 2-hydroxypropyl methacrylate, 2-hydroxypropyl acrylate, 1,3-dimethacryloxy-2-propanol, 1,3-diacryloxy-2-propanol, 1-acryloxy-3-methacryloxy-2-propanol, pentaerythritol trimethacrylate, pentaerythritol triacrylate, bis(2,2,2-trimethylolethyl) ether pentamethacrylate, bis(2,2,2-trimethylolethyl) ether pentaacrylate, trimethylolpropane dimethacrylate, trimethylolpropane diacrylate, allyl alcohol, crotyl alcohol, methyl vinyl carbinol, cinnamyl alcohol, 4-vinylbenzyl alcohol, 3-vinylbenzyl alcohol, 2-(4-vinylbenzylthio)ethanol, 2-(3-vinylbenzylthio)ethanol, 1,3-bis(4-vinylbenzylthio)-2-propanol, 1,3-bis(3- vinylbenzylthio)-2-propanol, 2,3-bis(4-vinylbenzylthio)-1-propanol, 2,3-bis(3-vinylbenzylthio)-1-propanol, 3-phenoxy-2-hydroxypropyl acrylate, 2-hydroxyethyl isocyanurate bis(acrylate), 2-hydroxyethyl isocyanurate bis(methacrylate), 2-hydroxyethyl cyanurate bis(acrylate), 2-hydroxyethyl cyanurate bis(methacrylate), 3-methyl-1-butyn-3-ol, 3-methyl-1-pentyn-3-ol and propargyl alcohol; polyhydroxy compounds such as pentaerythritol dimethacrylate, pentaerythritol diacrylate, pentaerythritol mono-methacrylate, pentaerythritol monoacrylate, trimethylolpropane monomethacrylate, trimethylolpropane monoacrylate, 2-hydroxyethyl isocyanurate mono(acrylate), 2-hydroxyethyl isocyanurate mono-(methacrylate), 2-hydroxyethyl cyanurate mono(acrylate) and 2-hydroxyethyl cyanurate mono(methacrylate); and unsaturated polyhydroxy compounds formed by the addition reaction of acrylic acid or methacrylic acid such as 2,2-bis[4-(2-hydroxy-3-methacryloxypropoxy)-phenyl]propane.

Examples of the phenol having unsaturated groups include 2-vinylphenol, 3-vinylphenol and 4-vinylphenol.

Examples of the mercaptoalcohol having unsaturated groups include 2-(4-vinylbenzylthio)-2-mercaptoethanol and 2-(3-vinylbenzylthio)-2-mercaptoethanol.

Examples of the carboxylic acid having unsaturated groups include acrylic acid, methacrylic acid, crotonic acid, monohydroxyethyl acrylate phthalate, maleic acid, fumaric acid, monoallyl phthalate and cinnamic acid.

Examples of the amide having unsaturated groups include amides of α,β-unsaturated carboxylic acids such as acrylic acid, methacrylic acid, maleic acid, maleic anhydride and fumaric acid; and N-vinylformamide.

From the standpoint of heat resistance, mercaptoalcohols, hydroxythiophenols and alcohols having unsaturated groups are preferable among the above compounds.

The above compounds may be used singly or as a mixture of two or more compounds.

In the process for producing a resin for optical materials of the present invention, the above antioxidants, adhesion improvers and other additives such as antioxidants other than the above antioxidants and various agent to improve properties which are optionally used as auxiliary materials are added to the epithio compound, the ultraviolet light absorbent and the catalyst which are used as the main materials and the prepared mixture is cured by polymerization to produce optical materials such as lenses. The mixture is cast into a mold made of glass or a metal and cured by heating. The cured product is then taken out of the mold.

It is possible that, before being cast into a mold, a preliminary polymerization of the entire amounts or portions of the epithio compound and the ultraviolet light absorbent is conducted at −100 to 160° C. for 0.1 to 48 hours in the presence or in the absence of a catalyst while being stirred or not stirred and then the prepared intermediate composition is cast into a mold. The curing time is 0.1 to 100 hours and generally 1 to 48 hours. The curing temperature is −10 to 160° C. and generally −10 to 140° C. The polymerization can be conducted by the steps of holding the temperature at a specific polymerization temperature for a specific period of time, increasing the temperature at a speed of 0.1 to 100° C./hour and decreasing the temperature at a speed of 0.1 to 100° C./hour or a combination of these steps. It is preferable that the material obtained after the curing is annealed at a temperature of 50 to 150° C. for about 10 minutes to 5 hours to remove strains from the prepared optical material of the present invention. Where necessary, the prepared material may receive treatments of tinting, formation of hard coat, prevention of reflection and prevention of clouding of the material.

The process for producing the resin for optical materials of the present invention is described more specifically in the following. The main materials and auxiliary materials are mixed together as described above and the obtained mixture is cast into a mold and cured. The epithio compound, the ultraviolet light absorbent and the catalyst which are used as the main materials and components which are optionally used, i.e., the compound having two or more functional groups reactive with the epithio group, the compound having one or more functional groups reactive with the epithio group and one or more homopolymerizable functional groups, the compound having one or more homopolymerizable groups, or the compound having one homopolymerizable functional group which is reactive with the epithio group and other optional components such as antioxidants, radical polymerization initiators, adhesion improvers and stabilizers, may be mixed together in one vessel at the same time in the entire amounts. Alternatively, the components may be added stepwise. Some components may also be mixed together separately in advance and the obtained mixtures may be mixed with other components in one vessel. The main materials and the auxiliary materials may be mixed together in any desired order. In general, the temperature of mixing and the time of mixing are not limited as long as the components can be sufficiently mixed together. However, an excessively high temperature and an excessively long time are not preferable because undesirable reactions take place between the components to increase viscosity and the operation of casting becomes difficult. The temperature of mixing should be in the range of about −50 to 100° C., preferably in the range of −30 to 50° C. and more preferably in the range of −5 to 30° C. The time of mixing is in the range of 1 minute to 5 hours, preferably in the range of 5 minutes to 2 hours, more preferably in the range of 5 to 30 minutes and most preferably in the range of about 5 to 15 minutes. It is preferable that degassing under a vacuum is conducted before, during or after mixing the materials and the additives to prevent formation of bubbles during casting and curing in the mold. The pressure of the degassing is 0.1 to 700 mmHg and preferably 10 to 300 mmHg. To obtain a better quality of the resin for optical materials in the present invention, it is preferable that impurities are removed before the casting from the main material and the auxiliary materials by filtration using a filter having a pore diameter of 0.1 to 3 microns.

To summarize the advantages of the present invention, in accordance with the process for producing a resin for optical materials of the present invention, the optical material, which is obtained by curing a compound having an epithio group by polymerization and shows an excellent balance between a high refractivity index and a large Abbe number, can exhibit improved light resistance without coloration after the preparation or clouding of the material. In other words, when an ultraviolet light absorbent is added to improve light resistance which is insufficient with a compound having an epithio group and the obtained material is cured by polymerization, the product has a drawback in that coloration and clouding takes place unlike conventional materials. This problem can be overcome by using the ultraviolet light absorbent and the catalyst in amounts satisfying the specific relations in accordance with the process of the present invention.

EXAMPLES

The present invention will be described more specifically with reference to the following examples. However, the present invention is not limited to the examples. For the measurement of physical properties of obtained polymers, flat plate test pieces having a thickness of 2 mm were used. The measurements and the evaluations were carried out in accordance with the following methods.

Refractivity index (nD) and Abbe number (vD) were measured at 25° C. by using an Abbe refractometer.

Color tone (δYI value) was measured by using a spectrocolorimeter soon after the preparation of a material (initial coloration) and after exposure to light as described below (light resistance).

Light resistance was evaluated by measuring an increase in the δYI value after irradiation of light from a burning carbon arc for 60 hours.

Clouding of a material was evaluated by irradiation of linear light in a dark room and visual observation of the material. The result is expressed in accordance with the following criterion:

A=no clouding at all
B=somewhat clouded, appearing bluish
C=clearly clouded, appearing white
D=much clouded, hard to see through
E=markedly clouded, almost no transparency In general, a material evaluated as A or B can be suitably used as an optical material and a material evaluated as D or E cannot be practically used.

Example 1

To 100 parts by weight of bis(β-epithiopropyl) sulfide, 0.005 parts by weight of 2-(2-hydroxy-5-tert-octylphenyl) benzotriazole (SUMISOLVE 340, a trade name; manufactured by SUMITOMO KAGAKU Co., Ltd.) as the ultraviolet light absorbent and 0.01 part by weight of N,N-diethanolamine as the catalyst were added and a homogeneous solution was prepared. The prepared solution was cast into a mold and cured by polymerization by heating in an oven while the temperature was raised from 40 to 100° C. in 10 hours. The physical properties of the obtained flat plate test piece were measured. The results are shown in Table 1.

Examples 2 to 12

The ultraviolet light absorbents and the catalysts shown in Table 1 were used and the same procedures as those conducted in Example 1 were conducted.

Comparative Examples 1 to 8

The ultraviolet light absorbents and the catalysts shown in Table 1 were used and the same procedures as those conducted in Example 1 were conducted. The obtained materials showed inferior color tone or transparency because the amount of the ultraviolet light absorbent or the catalyst was outside the range of the present invention.

Examples 13 to 17

Bis(β-epithiopropylthio)ethane, the ultraviolet light absorbents shown in Table 2 and the catalysts also shown in Table 2 were used and the same procedures as those conducted in Example 1 were conducted.

Comparative Examples 9 to 12

Bis(β-epithiopropylthio)ethane, the ultraviolet light absorbents shown in Table 2 and the catalysts also shown in Table 2 were used and the same procedures as those conducted in Example 1 were conducted. The obtained materials showed inferior color tone or transparency because the amount of the ultraviolet light absorbent or the catalyst was outside the range of the present invention.

Examples 18 to 22

Bis(β-epithiopropyloxy)ethane, the ultraviolet light absorbents shown in Table 3 and the catalysts also shown in Table 3 were used and the same procedures as those conducted in Example 1 were conducted. THINUBIN 234 (a trade name, manufactured by NIPPON CIBA GEIGY Co., Ltd.) shown in Table 3 is 2-[2-hydroxy-3,5-bis(α,α-dimethylbenzyl)-phenyl]-2H-benzotriazole.

Comparative Examples 13 to 16

Bis(β-epithiopropyloxy)ethane, the ultraviolet light absorbents shown in Table 3 and the catalysts also shown in Table 3 were used and the same procedures as those conducted in Example 1 were conducted. The obtained materials showed inferior color tone or transparency because the amount of the ultraviolet light absorbent or the catalyst was outside the range of the present invention.

Examples 23 to 27

4-Epithioethyl-1,2-epithiocyclohexane, the ultraviolet light absorbents shown in Table 4 and the catalysts also shown in Table 4 were used and the same procedures as those conducted in Example 1 were conducted.

Comparative Examples 17 to 20

4-Epithioethyl-1,2-epithiocyclohexane, the ultraviolet light absorbents shown in Table 4 and the catalysts also shown in Table 4 were used and the same procedures as those conducted in Example 1 were conducted. The obtained materials showed inferior color tone or transparency because the amount of the ultraviolet light absorbent or the catalyst was outside the range of the present invention.

Examples 28 to 36

The ultraviolet light absorbents and the catalysts shown in Table 5 were used and the same procedures as those conducted in Example 1 were conducted. SUMISOLVE 110 234 (a trade name, manufactured by SUMITOMO KAGAKU Co., Ltd.) shown in Table 5 is 2-hydroxy-4-methoxybenzophenone and BIOSORB 910 (a trade name, manufactured by KYODO YAKUHIN Co., Ltd.) also shown in Table 5 is ethyl-2-cyano-3,3-diphenyl acrylate.

Comparative Examples 21 to 24

The ultraviolet light absorbents and the catalysts shown in Table 5 were used and the same procedures as those conducted in Example 1 were conducted. The obtained materials showed inferior color tone or transparency because the amount of the ultraviolet light absorbent or the catalyst was outside the range of the present invention.

TABLE 1-1

| | epithio compound | ultraviolet light absorbent | catalyst | refractivity index/Abbe | color tone (YI value) | | clouding |
|---|---|---|---|---|---|---|---|
| | part by weight | part by weight | part by weight | number $n_D/\nu_D$ | initial | light resistance | |
| Example 1 | bis(β-epithio-propyl)sulfide = 100 | SUMISOLVE 340 = 0.005 | N,N-diethyl-ethanolamine = 0.01 | 1.71/36 | 0.7 | 1.4 | B |
| Example 2 | bis(β-epithio-propyl)sulfide = 100 | SUMISOLVE 340 = 0.005 | N,N-diethyl-ethanolamine = 0.2 | 1.71/36 | 0.6 | 1.4 | A |
| Example 3 | bis(β-epithio-propyl)sulfide = 100 | SUMISOLVE 340 = 0.005 | N,N-diethyl-ethanolamine = 2.0 | 1.71/36 | 0.6 | 1.4 | A |
| Example 4 | bis(β-epithio-propyl)sulfide = 100 | SUMISOLVE 340 = 0.02 | N,N-diethyl-ethanolamine = 0.01 | 1.71/36 | 0.7 | 1.3 | B |
| Example 5 | bis(β-epithio-propyl)sulfide = 100 | SUMISOLVE 340 = 0.02 | N,N-diethyl-ethanolamine = 0.2 | 1.71/36 | 0.6 | 1.3 | A |
| Example 6 | bis(β-epithio-propyl)sulfide = 100 | SUMISOLVE 340 = 0.02 | N,N-diethyl-ethanolamine = 2.0 | 171/36 | 0.6 | 1.4 | A |
| Example 7 | bis(β-epithio-propyl)sulfide = 100 | SUMISOLVE 340 = 0.1 | N,N-diethyl-ethanolamine = 0.01 | 1.71/36 | 0.7 | 1.1 | B |
| Example 8 | bis(β-epithio-propyl)sulfide = 100 | SUMISOLVE 340 = 0.1 | N,N-diethyl-ethanolamine = 0.2 | 1.71/36 | 0.6 | 1.1 | A |
| Example 9 | bis(β-epithio-propyl)sulfide = 100 | SUMISOLVE 340 = 0.2 | N,N-diethyl-ethanolamine = 0.2 | 1.71/36 | 0.7 | 1.0 | A |
| Example 10 | bis(p-epithio-propyl)sulfide = 100 | SUMISOLVE 340 = 0.4 | N,N-diethyl-ethanolamine = 0.2 | 1.71/36 | 0.7 | 1.0 | A |
| Example 11 | bis(β-epithio-propyl)sulfide = 100 | SUMISOLVE 340 = 0.7 | N,N-diethyl-ethanolamine = 0.02 | 1.71/36 | 0.7 | 0.9 | B |

TABLE 1-2

| | epithio compound | ultraviolet light absorbent | catalyst | refractivity index/Abbe | color tone (YI value) | | clouding |
|---|---|---|---|---|---|---|---|
| | part by weight | part by weight | part by weight | number $n_D/\nu_D$ | initial | light resistance | |
| Example 12 | bis(β-epithio-propyl)sulfide = 100 | SUMISOLVE 340 = 0.1 | N,N-diethyl-ethanolamine = 2.0 | 1.71/36 | 0.6 | 1.1 | B |
| Comparative Example 1 | bis(p-epithio-propyl)sulfide = 100 | SUMISOLVE 340 = 0.005 | N,N-diethyl-ethanolamine = 0.0008 | 1.71/36 | 1.0 | 1.5 | D |
| Comparative Example 2 | bis(β-epithio-propyl)sulfide = 100 | SUMISOLVE 340 = 0.005 | N,N-diethyl-ethanolamine = 6.0 | 1.71/36 | 1.3 | 2.1 | C |
| Comparative Example 3 | bis(β-epithio-propyl)sulfide = 100 | SUMISOLVE 340 = 0.02 | N,N-diethyl-ethanolamine = 0.0008 | 1.71/36 | 1.1 | 1.4 | D |
| Comparative | bis(β-epithio- | SUMISOLVE | N,N-diethyl- | 1.71/36 | 1.3 | 1.9 | C |

TABLE 1-2-continued

| | epithio compound | ultraviolet light absorbent | catalyst | refractivity index/Abbe | color tone (YI value) | | clouding |
|---|---|---|---|---|---|---|---|
| | part by weight | part by weight | part by weight | number $n_D/v_D$ | initial | light resistance | |
| Example 4 | bis(β-epithio-propyl)sulfide = 100 | SUMISOLVE 340 = 0.02 | N,N-diethyl-ethanolamine = 6.0 | | | | |
| Comparative Example 5 | bis(β-epithio-propyl)sulfide = 100 | SUMISOLVE 340 = 0.1 | N,N-diethyl-ethanolamine = 0.0008 | 1.71/36 | 1.2 | 1.1 | E |
| Comparative Example 6 | bis(β-epithio-propyl)sulfide = 100 | SUMISOLVE 340 = 0.1 | N,N-diethyl-ethanolamine = 6.0 | 1.70/36 | 1.8 | 1.5 | C |
| Comparative Example 7 | bis(β-epithio-propyl)sulfide = 100 | SUMISOLVE 340 = 0.0008 | N,N-diethyl-ethanolamine = 0.2 | 1.71/36 | 0.6 | 5.8 | A |
| Comparative Example 8 | bis(p-epithio-propyl)sulfide = 100 | SUMISOLVE 340 = 2.0 | N,N-diethyl-ethanolamine = 0.2 | 1.71/36 | 1.3 | 0.9 | E |

TABLE 2

| | epithio compound | ultraviolet light absorbent | catalyst | refractivity index/Abbe | color tone (YI value) | | clouding |
|---|---|---|---|---|---|---|---|
| | part by weight | part by weight | part by weight | number $n_D/v_D$ | initial | light resistance | |
| Example 13 | bis(β-epithio-propylthio)ethane = 100 | SUMISOLVE 340 = 0.005 | N,N-dimethyl-cyclohexylamine = 0.2 | 1.70/36 | 0.6 | 1.4 | A |
| Example 14 | bis(β-epithio-propylthio)ethane = 100 | SUMISOLVE 340 = 0.1 | N,N-dimethyl-cyclohexylamine = 0.01 | 1.70/36 | 0.7 | 1.1 | B |
| Example 15 | bis(13-epithio-propylthio)ethane = 100 | SUMISOLVE 340 = 0.1 | N,N-dimethyl-cyclohexylamine = 0.2 | 1.70/36 | 0.6 | 1.1 | A |
| Example 16 | bis(β-epithio-propylthio)ethane = 100 | SUMISOLVE 340 = 0.4 | N,N-dimethyl-cyclohexylamine = 0.2 | 1.70/36 | 0.7 | 0.9 | B |
| Example 17 | bis(β-epithio-propylthio)ethane = 100 | SUMISOLVE 340 = 0.1 | N,N-dimethyl-cyclohexylamine = 1.0 | 1.70/36 | 0.6 | 1.1 | B |
| Comparative Example 9 | bis(13-epithio-propylthio)ethane = 100 | SUMISOLVE 340 = 0.1 | N,N-dimethyl-cyclohexylamine = 0.0008 | 1.70/36 | 1.2 | 1.2 | E |
| Comparative Example 10 | bis(β-epithio-propylthio)ethane = 100 | SUMISOLVE 340 = 0.1 | N,N-dimethyl-cyclohexylamine = 6.0 | 1.69/36 | 2.3 | 1.5 | C |
| Comparative Example 11 | bis(β-epithio-propylthio)ethane = 100 | SUMISOLVE 340 = 0.0008 | N,N-dimethyl-cyclohexylamine = 0.2 | 1.70/36 | 0.6 | 6.1 | A |
| Comparative Example 12 | bis(β-epithio-propylthio)ethane = 100 | SUMISOLVE 340 = 2.0 | N,N-dimethyl-cyclohexylamine = 0.2 | 1.70/36 | 1.3 | 0.8 | D |

TABLE 3

| | epithio compound | ultraviolet light absorbent | catalyst | refractivity index/Abbe | color tone (YI value) | | clouding |
|---|---|---|---|---|---|---|---|
| | part by weight | part by weight | part by weight | number $n_D/v_D$ | initial | light resistance | |
| Example 18 | bis(p-epithio-propyloxy)ethane = 100 | THINUBIN 234 = 0.005 | N,N-dimethyl-ethanolamine = 0.2 | 1.60/46 | 0.6 | 1.4 | A |
| Example 19 | bis(β-epithio-propyloxy)ethane = 100 | THINUBIN 234 = 0.1 | N,N-dimethyl-ethanolamine = 0.01 | 1.60/46 | 0.7 | 1.1 | A |

TABLE 3-continued

| | epithio compound | ultraviolet light absorbent | catalyst | refractivity index/Abbe | color tone (YI value) | | clouding |
|---|---|---|---|---|---|---|---|
| | part by weight | part by weight | part by weight | number $n_D/v_D$ | initial | light resistance | |
| Example 20 | bis(β-epithio-propyloxy)ethane = 100 | THINUBIN 234 = 0.1 | N,N-dimethyl-ethanolamine = 0.2 | 1.60/46 | 0.6 | 1.1 | A |
| Example 21 | bis(β-epithio-propyloxy)ethane = 100 | THINUBIN 234 = 0.4 | N,N-dimethyl-ethanolamine = 0.2 | 1.60/46 | 0.7 | 1.0 | A |
| Example 22 | bis(β-epithio-propyloxy)ethane = 100 | THINUBIN 234 = 0.1 | N,N-dimethyl-ethanolamine = 2.0 | 1.60/46 | 0.7 | 1.1 | A |
| Comparative Example 13 | bis(β-epithio-propyloxy)ethane = 100 | THINUBIN 234 = 0.1 | N,N-dimethyl-ethanolamine = 0.0008 | 1.60/46 | 1.2 | 1.1 | D |
| Comparative Example 14 | bis(β-epithio-propyloxy)ethane = 100 | THINUBIN 234 = 0.1 | N,N-dimethyl-ethanolamine = 6.0 | Rapidly polymerized during mixing to form gel | | | |
| Comparative Example 15 | bis(β-epithio-propyloxy)ethane = 100 | THINUBIN 234 = 0.0008 | N,N-dimethyl-ethanolamine = 0.2 | 1.60/46 | 0.6 | 5.9 | A |
| Comparative Example 16 | bis(β-epithio-propyloxy)ethane = 100 | THINUBIN 234 = 2.0 | N,N-dimethyl-ethanolamine 0.2 | 1.60/46 | 1.3 | 0.8 | D |

TABLE 4

| | epithio compound | ultraviolet light absorbent | catalyst | refractivity index/Abbe | color tone (YI value) | | clouding |
|---|---|---|---|---|---|---|---|
| | part by weight | part by weight | part by weight | number $n_D/v_D$ | initial | light resistance | |
| Example 23 | 4-epithioethyl-1,2-epithiocyclo-hexane = 100 | SUMISOLVE 340 = 0.005 | triethylamine = 0.2 | 1.63/46 | 0.7 | 1.4 | A |
| Example 24 | 4-epithioethyl-1,2-epithiocyclo-hexane = 100 | SUMISOLVE 340 = 0.1 | triethylamine = 0.01 | 1.63/46 | 0.7 | 1.1 | B |
| Example 25 | 4-epithioethyl-1,2-epithiocyclo-hexane = 100 | SUMISOLVE 340 = 0.1 | triethylamine = 0.2 | 1.63/46 | 0.7 | 1.1 | A |
| Example 26 | 4-epithioethyl-1,2-epithiocyclo-hexane = 100 | SUMISOLVE 340 = 0.4 | triethylamine = 0.2 | 1.63/46 | 0.7 | 1.0 | A |
| Example 27 | 4-epithioethyl-1,2-epithiocyclo-hexane = 100 | SUMISOLVE 340 = 0.1 | triethylamine = 2.0 | 1.63/46 | 0.7 | 1.1 | A |
| Comparative Example 17 | 4-epithioethyl-1,2-epithiocyclo-hexane = 100 | SUMISOLVE 340 = 0.1 | triethylamine = 0.0008 | 1.63/46 | 1.3 | 1.0 | E |
| Comparative Example 18 | 4-epithioethyl-1,2-epithiocyclo-hexane = 100 | SUMISOLVE 340 = 0.1 | triethylamine = 6.0 | 1.62/46 | 1.9 | 1.1 | D |
| Comparative Example 19 | 4-epithioethyl-1,2-epithiocyclo-hexane = 100 | SUMISOLVE 340 = 0.0008 | triethylamine = 0.2 | 1.63/46 | 0.7 | 5.9 | A |
| Comparative Example 20 | 4-epithioethyl-1,2-epithiocyclo-hexane = 100 | SUMISOLVE 340 = 2.0 | triethylamine = 0.2 | 1.63/46 | 1.4 | 0.8 | D |

TABLE 5-1

| | epithio compound part by weight | ultraviolet light absorbent part by weight | catalyst part by weight | refractivity index/Abbe number $n_D/\nu_D$ | color tone (YI value) | | clouding |
|---|---|---|---|---|---|---|---|
| | | | | | initial | light resistance | |
| Example 28 | bis(β-epithiopropyl) sulfide/n-butyl thioglycolate/hydroxy-ethyl methacrylate = 93/6/1 | SUMISOLVE 340 = 0.1 | N,N-diethyl-ethanolamine = 0.2 | 1.70/36 | 0.6 | 1.0 | A |
| Example 29 | bis(β-epithiopropyl) sulfide/n-butyl thioglycolate/ mercaptoethanol = 94.5/2.5/3 | SUMISOLVE 340 = 0.1 | N,N-diethyl-ethanolamine = 0.2 | 1.70/36 | 0.5 | 1.0 | A |
| Example 30 | bis(β-epithiopropyl) sulfide/bis(mercapto-ethyl)sulfide/ 3-phenoxy-2-hydroxypropyl acrylate = 90/5/5 | SUMISOLVE 340 = 0.1 | N,N-diethyl-ethanolamine = 0.2 | 1.70/36 | 0.6 | 1.0 | A |
| Example 31 | bis(β-epithiopropyl) sulfide/n-butyl thioglycolate/hydroxy-ethyl methacrylate = 93/6/1 | SUMISOLVE 110 = 0.1 | N,N-diethyl-ethanolamine = 0.2 | 1.70/36 | 0.6 | 1.1 | A |
| Example 32 | bis(β-epithiopropyl) sulfide/n-butyl thioglycolate/ mercaptoethanol = 94.5/2.5/3 | SUMISOLVE 110 = 0.1 | N,N-diethyl-ethanolamine = 0.2 | 1.70/36 | 0.5 | 1.2 | A |
| Example 33 | bis(β-epithiopropyl) sulfide/bis(mercapto-ethyl)sulfide/ 3-phenoxy-2-hydroxypropyl acrylate = 90/5/5 | SUMISOLVE 110 = 0.1 | N,N-diethyl-ethanolamine = 0.2 | 1.70/36 | 0.6 | 1.1 | A |
| Example 34 | bis(β-epithiopropyl) sulfide/n-butyl thioglycolate/hydroxy-ethyl methacrylate = 93/6/1 | BIOSORB 910 = 0.1 | N,N-diethyl-ethanolamine = 0.2 | 1.70/36 | 0.5 | 1.1 | A |
| Example 35 | bis((3-epithiopropyl) sulfide/n-butyl thioglycolate/ mercaptoethanol = 94.5/2.5/3 | BIOSORB 910 = 0.1 | N,N-diethyl-ethanolamine = 0.2 | 1.70/36 | 0.5 | 1.1 | A |

TABLE 5-2

| | epithio compound part by weight | ultraviolet light absorbent part by weight | catalyst part by weight | refractivity index/Abbe number $n_D/v_D$ | color tone (YI value) initial | light resistance | clouding |
|---|---|---|---|---|---|---|---|
| Example 36 | bis(β-epithiopropyl) sulfide/bis(mercapto-ethyl sulfide / 3-phenoxy-2-hydroxypropyl acrylate = 90/5/5 | BIOSORB 910 = 0.1 | N,N-diethyl-ethanolamine = 0.2 | 1.70/36 | 0.5 | 1.0 | A |
| Comparative Example 21 | bis(β-epithiopropyl) sulfide/n-butyl thioglycolate/ hydroxyethyl methacrylate = 93/6/1 | SUMISOLVE 340 = 0.1 | N,N-diethyl-ethanolamine = 0.0008 | 1.70/36 | 1.1 | 1.1 | E |
| Comparative Example 22 | bis(β-epithiopropyl) sulfide/n-butyl thioglycolate/ mercaptoethanol = 94.5/2.5/3 | SUMISOLVE 340 = 0.1 | N,N-diethyl-ethanolamine = 6.0 | 1.69/36 | 1.8 | 1.0 | D |
| Comparative Example 23 | bis(β-epithiopropyl) sulfide/bis-(mercaptoethyl) sulfide/3-phenoxy-2-hydroxypropyl acrylate = 90/5/5 | SUMISOLVE 340 = 2.0 | N,N-diethyl-ethanolamine = 0.2 | 1.70/36 | 1.5 | 0.8 | D |
| Comparative Example 24 | bis(β-epithiopropyl) sulfide/bis-(mercaptoethyl) sulfide/3-phenoxy-2-hydroxypropyl acrylate = 90/5/5 | SUMISOLVE 340 = 0.0008 | N,N-diethyl-ethanolamine = 0.2 | 1.70/36 | 1.2 | 5.8 | A |

What is claimed is:

1. A process for producing a resin used for preparing an optical material which process comprises curing a composition by polymerization in the presence of a catalyst, the composition comprising an ultraviolet light absorbent and an epithio compound having, in one molecule thereof, one or more structures represented by the following formula (1):

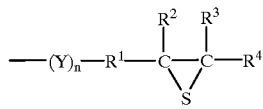

(1)

wherein $R^1$ represents a hydrocarbon group having 1 to 10 carbon atoms, $R^2$, $R^3$ and $R^4$ each represents a hydrogen atom or a hydrocarbon group having 1 to 10 carbon atoms, Y represents S or O and n represents 0 or 1;

wherein the ultraviolet light absorbent and the catalyst are in amounts, each expressed as parts by weight per 100 parts by weight of the total amount of the epithio compound, which satisfy both of the following relationships (a) and (b):

0.001 ≤ ultraviolet light absorbent ≤ 1.000 (a)

0.001 ≤ catalyst ≤ 5.000 (b).

2. The process according to claim 1, wherein the epithio compound is an epithioalkylthio compound or an epithioalkyloxy compound having, in one molecule thereof, one or more structures represented by the following formula (2):

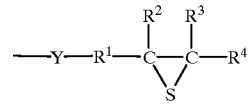

(2)

wherein $R^1$ represents a hydrocarbon group having 1 to 10 carbon atoms, $R^2$, $R^3$ and $R^4$ each represents a hydrogen atom or a hydrocarbon group having 1 to 40 carbon atoms and Y represents S or O.

3. The process according to claim 1, wherein the epithio compound is an epithioalkylthio compound having, in one molecule thereof, one or more structures represented by the following formula (3):

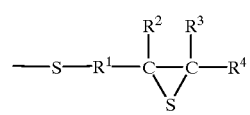

(3)

wherein $R^1$ represents a hydrocarbon group having 1 to 10 carbon atoms and $R^2$, $R^3$ and $R^4$ each represents a hydrogen atom or a hydrocarbon group having 1 to 10 carbon atoms.

4. The process according to claim 1, wherein the ultraviolet light absorbent is at least one compound selected from the group consisting of compounds having a benzotriazole structure, compounds having a benzophenone structure and compounds having a cyanoacrylate structure.

5. The process according to claim 1, wherein the ultraviolet light absorbent is a compound having a benzotriazole structure.

6. The process according to claim 1, wherein the ultraviolet light absorbent and the catalyst are in amounts, each expressed as parts by weight per 100 parts by weight of the total amount of the epithio compound, which satisfy both of the following relationships:

0.005≦ultraviolet light absorbent≦0.500

0.005≦catalyst≦5.000.

7. The process according to claim 1, wherein the ultraviolet light absorbent and the catalyst are in amounts, each expressed as parts by weight per 100 parts by weight of the total amount of the epithio compound, which satisfy both of the following relationships:

0.010≦ultraviolet light absorbent≦0.300

0.010≦catalyst≦3.000.

8. The process according to claim 7, wherein $R^1$ is a methylene group or an ethylene group and $R^2$, $R^3$ and $R^4$ are each a hydrogen atom or a methyl group.

9. The process according to claim 7, wherein $R^1$ is a methylene group; $R^2$, $R^3$ and $R^4$ are each a hydrogen atom; and n is 1.

10. The process according to claim 7, wherein the epithio compound is selected from the group consisting of 1,1-bis(epithioethyl)methane, 1-(epithioethyl)-1-(β-epithiopropyl)-methane, 1,1-bis(β-epithiopropyl) methane, 1-(epithioethyl)-1-(β-epithiopropyl)-ethane, 1,2-bis(β-epithiopropyl)ethane, 1-(epithioethyl)-3-(β-epithiopropyl) butane, 1,3-bis(β-epithiopropyl)propane, 1-(epithioethyl)-4-(β-epithiopropyl)pentane, 1,4-bis(β-epithiopropyl)butane, 1-(epithioethyl)-5-(β-epithiopropyl)hexane, 1-(epithioethyl)-2-(γ-epithiobutylthio)-ethane, 1-(epithioethyl)-2-[2-(γ-epithiobutylthio)ethylthio]ethane, tetrakis-(β-epithiopropyl)methane, 1,1,1-tris(β-epithiopropyl)propane, 1,3-bis(β-epithiopropyl)-1-(β-epithiopropyl)-2-thiapropane, 1,5-bis(β-epithiopropyl)-2,4-bis(β-epithiopropyl)-3-thiapentane, 1,2,3,4-diepithiocyclohexane, 1,2:4,5-diepthiocyclohexane, 4-epithioethyl-1,2-epithiocyclohexane, 1,3- bis (epithioethyl)cyclohexane, 1,4-bis(epithioethyl)cyclohexane, 1,3- bis (β-epithiopropyl) cyclohexane, 1,4-bis(β-epithiopropyl)cyclohexane, bis[4(epithioethyl)cyclohexyl]-methane, bis[4-(β-epithiopropyl)cyclohexyl]methane, 2,2-bis[4-(epithioethyl)cyclohexyl]propane, 2,2-bis[4-(β-epithiopropyl)cyclohexyl]-propane, bis[4-(β-epithiopropyl)-cyclohexyl] sulfide, bis[4-(epithioethyl)cyclohexyl] sulfide, 2,5-bis-(epithioethyl)-1,4-dithiane, 2,5-bis(β-epithiopropyl)-1,4-dithiane, 4-epithioethyl-1,2-cyclohexene sulfide 4-epoxy-1,2-cyclohexene sulfide, 1,3-bis(epithioethyl)benzene, 1,4-bis(epithioethyl)benzene, 1,3-bis(epithioethyl)benzene, 1,4-bis(β-epithiopropyl)benzene, bis[4-(epithioethyl)phenyl]methane, bis[4-(β-epithiopropyl)phenyl]-methane, 2,2-bis(4-(epithioethyl)phenyl]propane, 2,2-bis[4-(β-epithiopropyl)phenyl]propane, bis[4-(epithioethyl)phenyl] sulfide, bis[4-(β-epithiopropyl)phenyl] sulfide, bis[4-(epithioethyl)phenyl] sulfone, bis[4-(β-epithiopropyl)phenyl] sulfone, 4,4'-bis(epithioethyl)biphenyl 4,4,-bis(S-epithiopropyl)biphenyl, bis(β-epithiopropyl) ether, bis(β-epithiopropyloxy)methane, 1,2-bis(β-epithiopropyloxy)ethane, 1,3-bis(β-epithiopropyloxy)propane, 1,2-bis(β-epithiopropyloxy)propane, 1-(β-epithiopropyloxy)-2-(β-epithiopropyloxy-methyl)propane, 1,4-bis(β-epithiopropyloxy)butane, 1,3-bis(β-epithiopropyloxy)butane, 1-(β-epithiopropyloxy)-3-(β-epithiopropyloxy-methyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, 1-(β-epithiopropyloxy)-5-(13-epithiopropyloxymethyl)hexane, 1-(β-epithiopropyloxy)-2-[(2-β-epithiopropyloxyethyl)oxy]ethane, 1-(β-epithiopropyloxy)-2-[[2-(2-β-epithiopropyloxyethyl)oxyethyl]oxy]ethane, tetrakis-(β-epithiopropyloxymethyl)methane, 1,1,1-tris(β-epithiopropyloxymethyl)propane, 1,5-bis(β-epithiopropyloxy)-2-(β-epithiopropyloxymethyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy)-4-(β-epithiopropyloxymethyl)-3,6-dithiaoctane, 1,8-bis(β-epithiopropyloxy) 4.5-bis(β-epithiopropyloxymethyl)-3,6-dithiaoctane, 1,8-bis(β-epithiopropyloxy)-4,4bis(β-epithiopropyloxymethyl)-3,6-dithiaoctane, 1,8-bis(β-epithiopropyloxy)-2,4,5-tris(β-epithiopropyloxymethyl)-3,6-dithiaoctane, 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2- β-epithiopropyloxyethyl)oxymethyl]-3,7-dithianonane, 1,10-bis(β-epithiopropyloxy)-5,6-bis[(2-β-epithiopropyloxyethyl)oxy]-3,6,9-trithiadecane, 1,11-bis(β-epithiopropyloxy)-4,8-bis(β-epithiopropyloxymethyl)-3,6,9-trithiaundecane, 1,11-bis(β-epithiopropyloxy)-5,7-bis(β-epithiopropyloxymethyl)-3,6,9-trithiaundecane, 1,11-bis(β-epithiopropyloxy)-5,7-[(2-β-epithiopropyloxyethyl)oxymethyl]-3,6,9-trithiaundecane, 1,11-bis(β-epithiopropyloxy)-4,7-bis(β-epithiopropyloxymethyl)-3,6,9-trithiaundecane,) 1,3-bis(β-epithiopropyloxy)cyclohexane, 1,4-bis(β-epithiopropyloxy)cyclohexane, 1,3-bis (Z-epithiopropyloxymethyl) cyclohexane, 1,4-bis(β-epithiopropyloxymethyl)cyclohexane, bis[4-(β-epithiopropyloxy)cyclohexyl]-methane, 2,2-bis[4-(β-epithiopropyloxy)cyclohexyl]propane, bis[4-(β-epithiopropyloxy)cyclohexyl] sulfide, 2,5-bis(β-epithiopropyloxymethyl)-1,4-dithiane, 2,5-bis(β-epithiopropyloxyethyloxymethyl)-1,4-dithiane, 1,3-bis (β-epithiopropyloxy) benzene, 1,4-bis(β-epithiopropyloxy)benzene 1,3-bis(β-epithiopropyloxymethyl) benzene, 1,4-bis(β-epithiopropyloxymethyl)benzene, bis[4-(β-epithiopropyloxy)phenyl]methane, 2,2-bis[4-(β-epithiopropyloxy)phenyl]propane, bis[4-(β-epithiopropyloxy)-phenyl] sulfide, bis[4-(β-epithiopropyloxy)phenyl] sulfone, 4,4'-bis(β-epithiopropyloxy)biphenyl, bis(β-epithiopropyl) sulfide, bis (β-epithiopropylthio)methane, 1,2-bis(β-epithiopropylthio)ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(O -epithiopropylthio)butane, 1,3-bis(β-epithiopropylthio) butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)-2-[[2-(2-β-epithiopropylthioethyl) thioethyl]thio]ethane, tetrakis(β-epithiopropylthiomethyl) methane, 1,1,1-tris(β-epithiopropylthiomethyl)propane, 1,5-bis(β-epithiopropylthio) 2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(t-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl) thiomethyl]-3,7-dithianonane, 1,10-bis(β-epithiopropylthio)-5,6-bis[(2-β-epithiopropylthioethyl) thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl) thiomethyl]-3,6,9-trithiaundecane and 1,11-bis(β-epithiopropylthio)-4,7-bis(β-epithiopropylthiomethyl)-3,6, 9-trithia-undecane, tetra[2-(β-epithiopropylthio) acetyimethyl]methane, 1,1,1-tri[2-(β-epithiopropylthio) acetylmethyl]propane, tetra[2-(β-epithiopropyl-thiomethyl) acetmethyl]methane, 1,1,1-tri[2-(β-eithiopropylthiomethyl)acetylmethyl]propane, 1,³-bis(B-epithiopropylthio)cyclohexane, 1,4-bis(β-epithiopropylthio) cyclohexane, 1,3-bis (β-epithiopropylthiomethyl) cyclohexane, 1,4-bis(β-epithiopropylthiomethyl) cyclohexane, bis[4-(β-epithiopropylthio)cyclohexyl]-methane, 2,2-bis([4(β-epithiopropylthio)cyclohexyl] propane, bis[4-(β-epithiopropylthio)cyclohexyl] sulfide, 2,5-bis(β-epithiopropylthiomethyl) 1,4-dithiane 2,5-bis(β-epithiopropylthioethylthiomethyl)-1,4-dithiane, 1,3-bis(β-epithiopropylthio)benzene, 1,4-bis(β-epithiopropylthio) benzene, 1,3-bis-(β-epithiopropylthiomethyl)benzene, 1,4-bis(β-epithiopropylthiomethyl)benzenes, bis(4-(β-epithiopropylthio)phenylmethane, 2,2-bis[4-(β-epithiopropylthio)phenyl]propane, bis[4-(β-epithiopropylthio)phenyl] sulfide, bis[4-(β-epithiopropylthio)phenyl] sulfone, 4,4'-bis(β-epithiopropylthio)biphenyl, vinylphenyl thioglycidyl ether, vinylbenzyl thioglycidyl ether, thioglycidyl methacrylate, thioglycidyl acrylate, allyl thioglycidyl ether, ethylene sulfide, propylene sulfide, thioglycidol, methyl thioglycidyl ether, ethyl thioglycidyl ether, propyl thioglycidyl ether and butyl thioglycidyl ether.

11. The process according to claim 7, wherein the epithio compound is bis(β-epithiopropyl) sulfide.

12. The process according to claim 10, wherein the ultraviolet light absorbent is selected from the group consisting of a salicyclic acid ultraviolet light absorbent, a benzophenone ultraviolet light absorbent, a benzotriazole ultraviolet light absorbent and a cyanoacrylate ultraviolet light absorbent.

13. The process according to claim 10, wherein the ultraviolet light absorbent is selected from the group consisting of phenyl salicylate, 4-tert-butylphenyl salicylate, 4-tert-octylphenyl salicylate, 2,4-di-tert-butylphenyl-3',5'-di-tert-butyl-4'-hydroxybenzoate, 2,4-dihydroxybenzophenone, 2-hydroxy-4'-methoxybenzophenone, 2-hydroxy-4-octoxybenzophenone, 2-hydroxy-4-dodecyloxybenzophenone, 2,2'-dihydroxy-4-methoxybenzophenone, 2-hydroxy-4-methoxy-5-sulfobenzophenone, 2-(2'-hydroxy-5'-methylphenyl) benzotriazole, 2-(2'-hydroxy-5'-methoxphenyl) benzotriazole, 2-(2'-hydroxy-5'-n-butylphenyl) benzotriazole, 2,(2'-hydroxy-5'-tert-butylphenyl) benzotriazole, 2-(2'-hydroxy-5'-n-octylphenyl) benzotriazole, 2-(2'-hydroxy-5'-n-octoxyphenyl) benzotriazole, 2-(2'-hydroxy-5'-tert-octylphenyl) benzotriazole, 2-(2'-hydroxy-4-n-octylphenyl) benzotriazole, 2-(2'-hydroxy-4'-n-octoxyphenyl) benzotriazole, 2-(2'-hydroxy-4-tert-octylphenyl) benzotriazole, 2-(2'-hydroxy-3',5'-di-tert-butylphenyl)-benzotriazole, 2-(2'-hydroxy-3',5'-dicumylphenyl) benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3', 5'-di-tert-amylphenyl)benzotriazole, 2-(2'-hydroxy-3'-(3",4",5", 6"-tetrahydrophthalimidomethyl)-5'-methylphenyl) benzotriazole and 6-(2-benzotriazolyl)-4-tert-octyl-6'-tert-butyl-4'-methyl-2,2'-methylenebisphenol, Specific examples of the cyanoacrylate ultraviolet light absorbent include 2-ethylhexyl-2-cyano-3',3'-diphenyl acrylate and ethyl-2-cyano-3',3'-diphenyl acrylate.

14. The process according to claim 13, wherein the catalyst is selected from the group consisting of an amine, a phosphine, a mineral acid, a Lewis acid, an organic acid, a silicic acid, tetrafluoroboric acid and a tin compound.

15. The process according to claim 13, wherein the catalyst is selected from the group consisting of a primary monoamine, a secondary monoamine, a tertiary monoamine, a tertiary polyamine, an imidazole, an amidine, a quaternary ammonium salt, a phosphine, dibutyltin dilaurate, dibutyltin dichloride and tributyltin chloride.

16. The process according to claim 13, wherein the process is carried out at a temperature of −50 to 100° C. for 1 minute to 5 hours.

17. The process according to claim 16, wherein the ultraviolet light absorbent is a benzotriazole compound and the epithio compound is bis(S-epithiopropyl) sulfide.

18. The process according to claim 7, wherein the epithio compound is bis(β-epithiopropyl) sulfide, the ultraviolet light absorbent is 2-(2-hydroxy-5-tert-octylphenyl) benzotriazole and the catalyst is N,N-diethanolamine.

\* \* \* \* \*